G. W. SMITH.
FRONT WHEEL DRIVE.
APPLICATION FILED JAN. 5, 1917.
1,232,402.
Patented July 3, 1917.
3 SHEETS—SHEET 1.
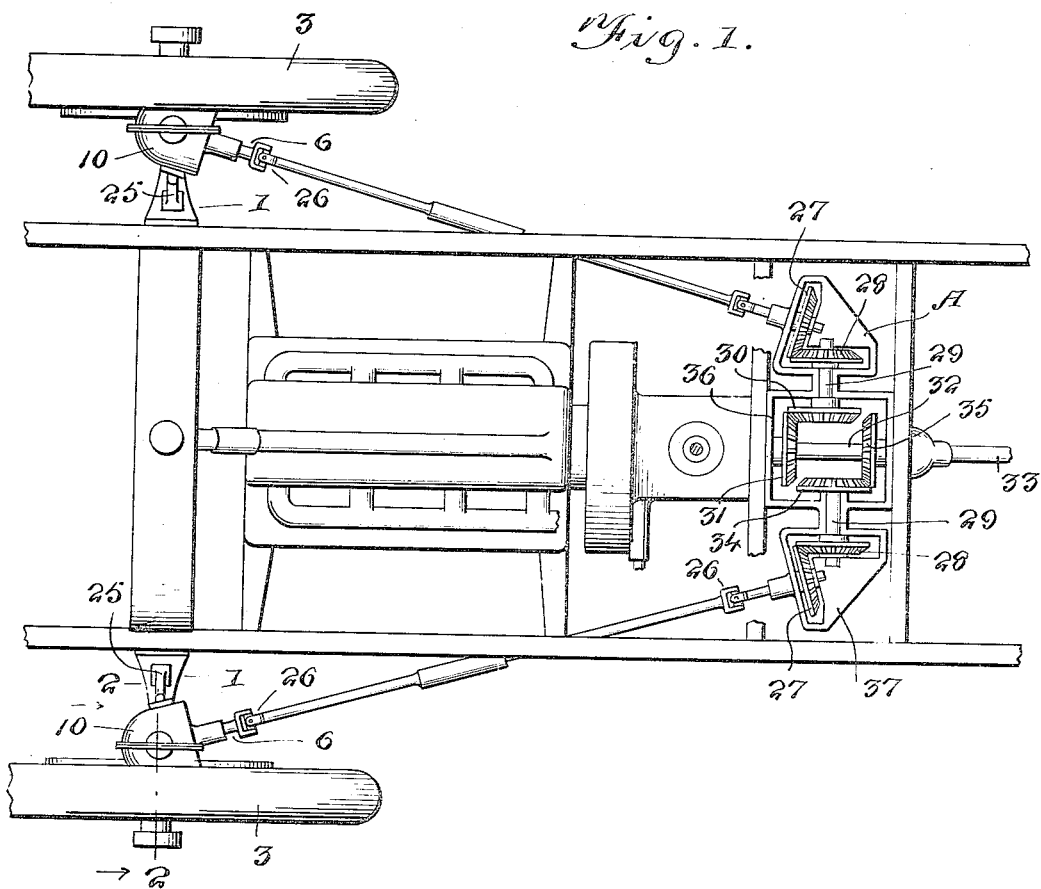
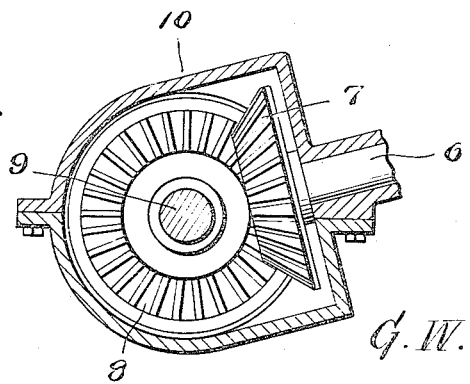
Witnesses
E. R. Ruppert
R. M. Smith
Inventor
G. W. Smith
By Victor J. Evans
Attorney

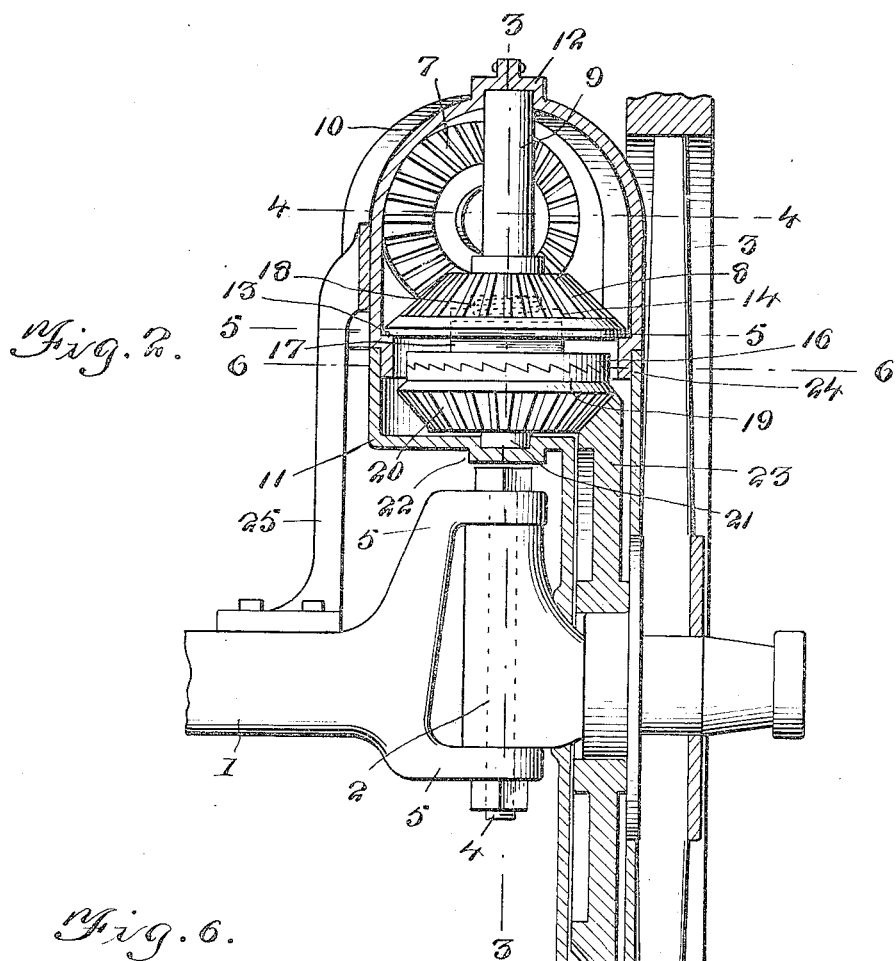
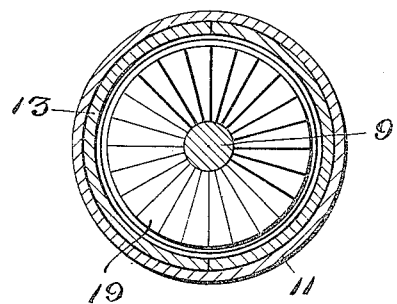

G. W. SMITH.
FRONT WHEEL DRIVE.
APPLICATION FILED JAN. 5, 1917.

1,232,402.

Patented July 3, 1917.
3 SHEETS—SHEET 3.

Witnesses
E. R. Ruppert
R. M. Smith

Inventor
G. W. Smith
By Victor J. Evans
Attorney

UNITED STATES PATENT OFFICE.

GEORGE W. SMITH, OF DALLAS, TEXAS.

FRONT-WHEEL DRIVE.

1,232,402.

Specification of Letters Patent.

Patented July 3, 1917.

Application filed January 5, 1917. Serial No. 140,801.

*To all whom it may concern:*

Be it known that I, GEORGE W. SMITH, a citizen of the United States, residing at Dallas, in the county of Dallas and State of Texas, have invented new and useful Improvements in Front-Wheel Drives, of which the following is a specification.

This invention relates to front wheel driving mechanism, the same being especially adapted for use in connection with the front or steering wheels of the present day automobile or motor vehicle.

The object of the invention is to provide simple and reliable driving mechanism between the engine and each of the front wheels of a motor vehicle, whereby a portion of the power of the engine is transmitted to said front wheels simultaneously with the transmission of the remainder of the power of the engine to the rear wheels, which are now commonly termed the driving wheels of the machine.

A further object in view is to provide a special form of housing or casing for the front wheel driving mechanism whereby the gears are fully inclosed so that they may run in grease, oil, or other lubricant.

Another object in view is to provide means whereby one of the front wheels of the machine is permitted to revolve faster than the other wheel, the same being necessary in turning the steering wheels for the purpose of directing the machine to the right or to the left.

With the above and other objects in view, the invention consists in the novel construction, combination and arrangement herein fully described, illustrated and claimed.

In the accompanying drawings:—

Figure 1 is a plan view of the improved driving mechanism for the front wheels of a motor vehicle.

Fig. 2 is an enlarged section on the line 2—2 of Fig. 1, taken in line with the axis of the steering knuckle.

Fig. 4 is a horizontal section on the line 4—4 of Fig. 2.

Fig. 6 is a section on the line 6—6 of Fig. 2.

Figure 3:
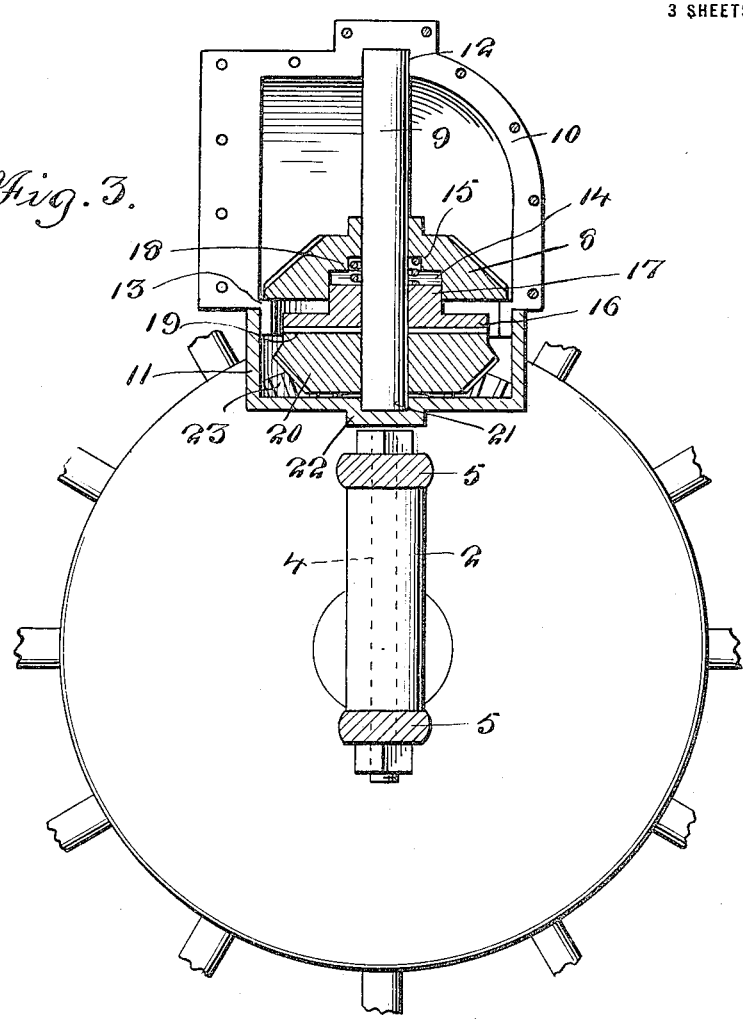
Fig. 3 is a vertical section on the line 3—3 of Fig. 2.
Figure 5:
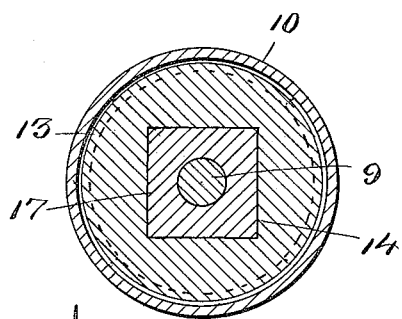
Fig. 5 is a section on the line 5—5 of Fig. 2.

Referring to the drawings, 1 designates one end of the front axle of a motor vehicle, 2 the steering knuckle and 3 one of the front wheels of the vehicle, said parts being of the usual construction and arrangement, the knuckle 2 being mounted on the substantially vertical pivot pin or shaft 4 carried by the arms 5 of the forked end of the axle 1.

In carrying out the present invention, I provide a pair of forwardly diverging front wheel driving shafts 6 each of which is geared to the engine shaft as hereinafter described and provided at the forward end thereof with a beveled gear 7 fast thereon. The gear 7 meshes with and drives another gear 8 mounted upon a vertical spindle or shaft 9 which is in direct alinement with and above the pivot shaft 4 on which the steering knuckle 2 is mounted. The gears 7 and 8 together with the shaft 9 are mounted in the upper section 10 of a housing or casing which comprises in addition thereto a lower or bottom section 11 the purpose of which will hereinafter appear. The upper section 10 is formed with a bearing step 12 for the upper extremity of the shaft 9 and is also formed with an annular bearing face 13 for the bottom of the gear 8.

The gear 8 is formed in the bottom thereof with a recess 14 which is square or non-circular in cross section and also with a counterbore or recess 15. Located under the gear 8 is a clutch member 16 having a squared or non-circular boss 17 on its upper face which is slidingly received in the recess 14 and being of the same shape as the recess 14, the clutch member 16 is forcibly driven by the gear 8. A spring 18 is arranged in the recess or counterbore 15 and bears against the boss 17 thereby serving to depress the clutch member 16 and yieldingly sustain the same in engagement with the clutch face 19 of another bevel gear 20 which is reversely disposed in relation to the gear 8. The lower end 21 of the shaft 4 is received in a bearing step 22 provided in the lower casing section 11 above referred to. The gear 8 meshes constantly with a comparatively large beveled gear 23 which bears a fixed relation to the adjacent steering wheel 3 to which it is bolted or otherwise fixedly secured.

The bottom section 11 of the casing or housing incloses the gears 20 and is fixedly secured to the steering knuckle 2 to which it may be fastened in any suitable way and by any suitable means. Said casing 11 is adapted to contain any suitable lubricating material in which the gears 20 and 23 may run with a minimum amount of friction. The upper casing section 10 is rabbeted adjacent to its lower end as indicated at 24 while the upper edge of the bottom casing 11 is shaped to fit into the rabbet 24 which being of annular or circular formation permits the upper edge of the bottom casing to turn in relation to the upper casing section 10 as the steering wheel 3 is swung to one side or the other. It will thus be understood that the bottom casing section 11 turns with the wheel and the steering knuckle while the upper casing section 10 is non-rotary, being supported by and fastened to a bracket 25 secured to the axle 1.

The shafts 6 are of the tumbling type, each of said shafts being made in sections and the sections being connected by universal joints 26. Fast on the rear end of each of said shafts 6 is a bevel gear 27 which meshes with another bevel gear 28, the gears 28 being fast on a pair of short transverse shafts 29 arranged slightly out of longitudinal alinement with each other. In other words one of the shafts 29 is set a little nearer the front axle than the other shaft 29. One of the shafts 29 has fast on the inner end thereof a bevel gear 30 which meshes with a bevel gear 31 of an extension shaft 32 located in alinement with and actuated by the propellor shaft 33 of the vehicle. The other shaft 29 has fast thereon a bevel gear 34 which meshes with another bevel gear 35 on the shaft 32 or as shown in Fig. 1. The gears 30 and 35 do not mesh with each other and neither do the gears 31 and 34. The result is that the shafts 6 are simultaneously driven in opposite directions and at equal speeds. All of the gears 27, 28, 30, 31, 34 and 35 are inclosed within an oil proof housing or casing designated generally at A and comprising the central portion 36 containing the gears 31 and 35 on the shaft 32 and the gears 30 and 34 on the shafts 29. The casing also comprises the end portions 37 which contain the gears 27 and 28. The casing A is of sectional or two-part construction so that it may be opened up for inspecting the gears therein and supplying the same with additional lubricant whenever necessary.

In operation, each shaft 6 derives its power from the engine of the vehicle and the gear 7 transmits motion to the gear 8. The last named gear, through the medium of the clutch member 17 driven thereby actuates the gear 20, the latter in turn driving the gear 23 and thereby the wheel 3. In making a turn with the vehicle, the clutch member 16 and the clutch face 19 of the gear 20 may slip or revolve relatively to each other through the yielding action of the spring 18 allowing the teeth of one clutch face to pass by the teeth of the other clutch face. When driving in a straight forward direction, both of the steering or front wheels of the machine are positively driven the same as the rear wheels. Thus the power of the engine is applied to all four of the wheels of the machine.

I claim:—

1. The combination with the steering wheel and steering knuckle of a motor vehicle of a beveled gear fixedly secured to said wheel, a driving shaft geared to the engine shaft, a beveled gear fast on said driving shaft, a gear driven thereby and mounted on a shaft in axial alinement with the shaft of the steering knuckle, another gear meshing directly with the gear secured to the wheel and having its axis also in line with the axis of the steering knuckle, coöperating clutch faces on the gears whose axes are in line with the axis of the steering knuckle, and yieldable means between the last named gears holding said clutch faces normally engaged.

2. The combination with the steering wheel and steering knuckle of a motor vehicle of a beveled gear fixedly secured to said wheel, a driving shaft geared to the engine shaft, a beveled gear fast on said driving shaft, a gear driven thereby and mounted on a shaft in axial alinement with the shaft of the steering knuckle, another gear meshing directly with the gear secured to the wheel and having its axis also in line with the axis of the steering knuckle, yieldable connecting means between the gears whose axes are in line with the axis of the steering knuckle, said connecting means comprising a clutch member movable into and out of engagement with a clutch face on one of the last named gears normally held yieldingly in clutching position.

3. The combination with the steering wheel and steering knuckle of a motor vehicle of a beveled gear fixedly secured to said wheel, a driving shaft geared to the engine shaft, a beveled gear fast on said driving shaft, a gear driven thereby and mounted on a shaft in axial alinement with the shaft on the steering knuckle, another gear meshing directly with the gear secured to the wheel and having its axis also in line with the axis of the steering knuckle and yieldable connecting means between the gears whose axes are in line with the axis of the steering knuckle, said connecting means providing for a positive driving action between the last named gears and also admitting of a relative rotative movement of said last named gears in one direction.

4. The combination with the steering wheel and steering knuckle of a motor vehicle of a beveled gear fixedly secured to said wheel, a driving shaft geared to the engine shaft, a beveled gear fast on said driving shaft, a gear driven thereby and mounted on said driving shaft in axial alinement with the shaft of the steering knuckle, another gear meshing directly with the gear secured to the wheel and having its axis also in line with the axis of the steering knuckle, yieldable connecting means between the gears whose axes are in line with the axis of the steering knuckle, and a sectional housing inclosing all of said gears, one section of said housing inclosing the large gear and the gear meshing therewith having an oscillatory movement in relation to the other section of the housing which incloses the gear on the driving shaft and the gear driven thereby.

In testimony whereof I affix my signature.

GEORGE W. SMITH.

Copies of this patent may be obtained for five cents each, by addressing the "Commissioner of Patents, Washington, D. C."